UNITED STATES PATENT OFFICE.

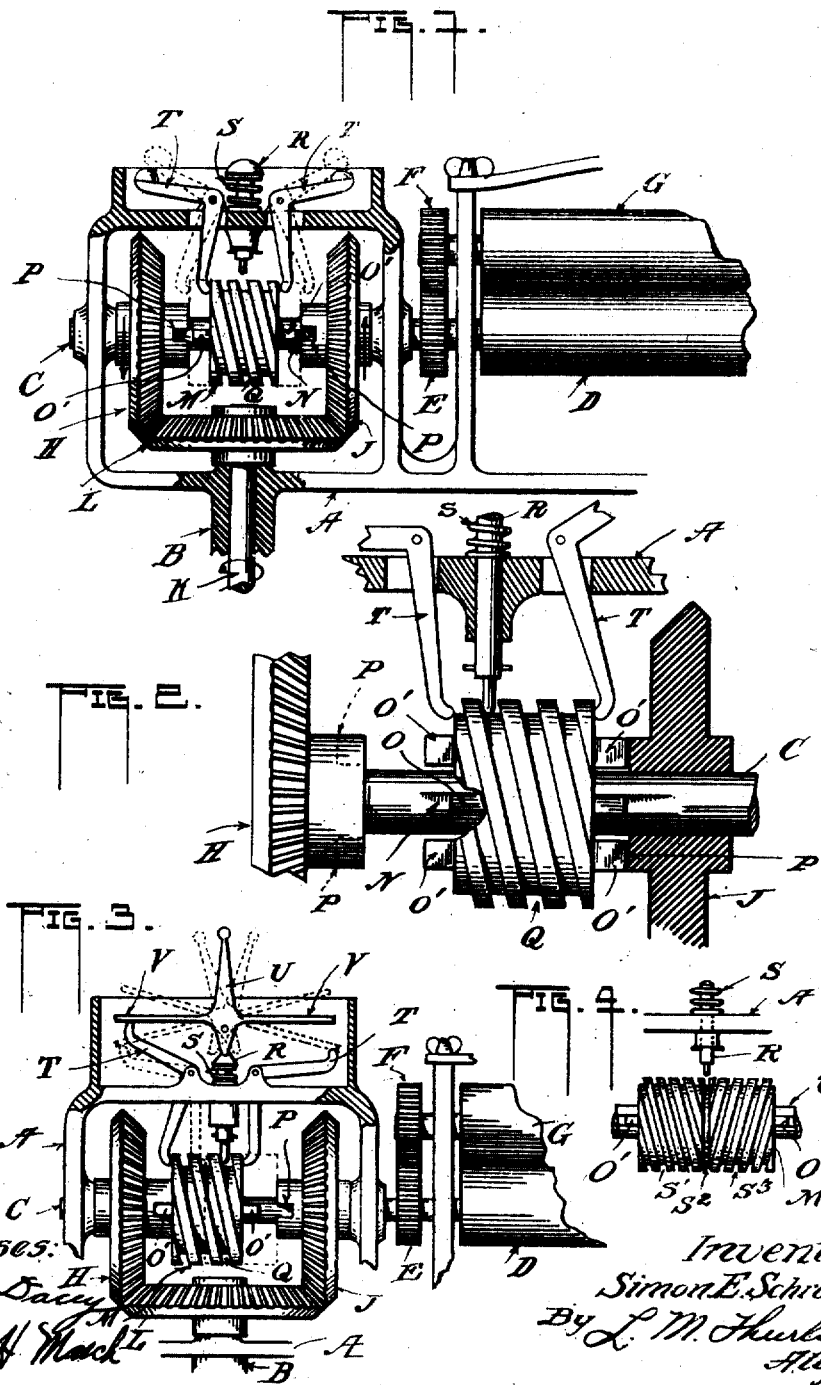

SIMON E. SCHROEDER, OF MINIER, ILLINOIS.

CLUTCH-OPERATING MECHANISM.

1,227,838.     Specification of Letters Patent.     Patented May 29, 1917.

Application filed June 8, 1914. Serial No. 843,816.

*To all whom it may concern:*

Be it known that I, SIMON E. SCHROEDER, citizen of the United States, residing at Minier, in the county of Tazewell and State of Illinois, have invented certain new and useful Improvements in Clutch-Operating Mechanism; and I do hereby declare that the following is a full, clear, and exact description of the invention, which will enable others skilled in the art to which it appertains to make and use the same.

This invention relates to clutch operating mechanism and particularly to means for shifting a clutch into engagement with one or more operating members, and still more particularly to retracting or withdrawing the clutch from one of said members, utilizing the operating or driving power and the rotation of the clutch for the disengaging act.

The object of the invention, therefore, is to provide a shiftable clutch member of a structure such that a part brought into engagement with it will cause it to be withdrawn from the part with which it is in engagement by utilizing the operating power which drives the mechanism while the latter is in rotation.

So far as my knowledge extends it has been customary to shift a clutch from engagement with a companion part by hand requiring structures by which considerable leverage can be obtained for that act. It is an easy matter to shift the clutch into engagement with a rotating part since there is no friction to prevent free movement but when the clutch and a rotating part are in engagement, one driving the other, the friction between them is usually so great as to prevent easy disengagement by hand. In view of this I have devised means for withdrawing a clutch from a companion part by making use of the operating power during the rotation of the parts as explained above.

In certain types of machines the hand lever for operating a clutch is bulky and therefore requires considerable space and is often in the way of a worker and this has led to the provision of some means less bulky, in addition to the other reasons already stated above.

In the accompanying drawing I have shown my invention as applied to a wringer structure to which it is particularly adapted and to show its application but it is to be understood I may use the invention on other types of structures where a clutch is employed.

Figure 1 is an elevation of a frame for carrying the rolls of a wringer showing part of the frame in section and my invention in connection therewith.

Fig. 2 shows a part of the structure of Fig. 1 on a much larger scale, and,

Fig. 3 shows a modified form of the invention.

Fig. 4 shows a modified form of a clutch.

A represents a frame which may be supported on a suitable standard B a part only of which is shown. C is a shaft journaled in the frame A and provided in the present instance with a wringer-roll D outside the frame, there being a spur gear E on the shaft in mesh with a similar gear F of a second wringer roll G mounted in a part of said frame.

I merely describe the wringer rolls to show the adaptation of my invention to a power driven part, it being evident that other mechanism may be used as well in connection with the invention to be described.

The shaft C carries any usual pair of spaced oppositely facing beveled gears H J mounted to freely rotate thereon. L is a similar gear engaging both the gears H J and affixed to a shaft K to which power is transmitted through the standard B.

M represents a clutch sleeve mounted on the shaft C between the gears H J to rotate with said shaft but slidable along the same, there being a key seat N in the latter and a feather O carried by said clutch sleeve. The ends of the latter and the gears H J are constructed so as to engage one another. For example, the said sleeve has extended portions O' and the hubs of the gears have recesses P to receive them. However, any other means of driving engagement may be used. The surface of the sleeve is provided with a spiral groove Q the purpose of which will appear presently.

Extending through the frame A toward the clutch-sleeve is a pin R whose end within the frame is adapted to engage the said spiral groove Q, there being a spring S on the pin outside the frame provided for holding the said pin in its outermost position so as to hold it away from the said sleeve, suitable means being furnished to limit the extent of outward movement imparted to said pin.

Extending through the frame A at opposite sides of the pin is a lever T in the form of a bell-crank. Each is pivoted to the frame A, there being suitable openings through the latter through which one of the arms of each lever extends and adapted to bear against the ends of the sleeve. The arms outside of the frame preferably extend in opposite directions substantially as shown. The inner arms normally lie against the ends of the sleeve as shown in Fig. 1 and pressure upon the outer end of either results in shifting the sleeve into engagement with one or the other of the gears as will be more fully explained in connection with the operation.

As shown in Fig. 1, the clutch sleeve is in its neutral position or midway between the gears. Power applied to the shaft K toward the left or in the direction indicated by the arrow, will turn the gear L in that direction and the gear H will rotate in the direction of the arrow or downward as seen in the drawing; while the gear J will rotate in the opposite direction or upward. Now, by placing pressure upon one of the lever arms T, for example the one at the right, the clutch sleeve will be shifted toward the left into engagement with the rotating gear H which in rotating the clutch drives the shaft C and the wringer roll D in the same direction. When it is desired to withdraw the clutch pressure is placed upon the pin R pushing it into the spiral groove Q. As the pin is held from lateral movement, the sleeve in its rotation, due to the side walls of the groove bearing against said pin, is moved along the shaft and withdrawn from engagement.

It is evident that if the pin were a member allowed to have lateral movement it would travel within the groove but since the pin is fixed in respect to lateral movement the clutch sleeve must move instead.

And it is thus observed that the rotation of a part provided with a spiral engaged by a relatively stationary part results in the disengaging act, the action, of course, being absolutely positive. When the parts are disengaged the rotation of the clutch sleeve is instantly terminated since there is no further driving engagement.

To reverse the direction of rotation the opposite lever T is depressed thereby moving the clutch-sleeve to the right, the disengaging action being accomplished in the same manner as before. In the present instance the spiral groove corresponds to a right-hand thread whereby by the engagement of the described pin R therewith the sleeve will be moved away from H, the latter always rotating in a single given direction. And because of the fact that the sleeve rotates in an opposite direction when in engagement with the gear J the groove causes it to shift toward the left in the disengaging act.

If the direction of rotation of L were reversed, thereby causing rotation of H and J in directions opposite from what they did before, the groove of the clutch sleeve would necessarily correspond to a left-hand thread in order to obtain the desired disengagement from either gear.

Fig. 2 shows portions of what is illustrated in Fig. 1 on a larger scale. This merely indicates the positions of the levers T when the clutch sleeve is shifted to one of its extreme positions.

In Fig. 3 I have shown a modified form of the invention most of the parts corresponding to those in Fig. 1 and designated by the same reference letters.

In addition to these parts I show a small hand lever U pivoted to a part of the frame A, directly above the pin R, this arrangement being employed where space is of no particular moment. The pin is shown in engagement with the groove Q, having been depressed by the lever U which extends below its supporting pivot and is adapted when engaging the head of the pin to occupy a vertical position in which position the pin is held depressed. As the clutch sleeve is withdrawn from the wheel with which it may be in engagement by the action previously described the levers T assume their proper positions, as in Fig. 1, ready for shifting the clutch sleeve. Said lever U is provided with oppositely extending arms V either one of which is adapted to depress its respective lever T depending upon the direction in which the lever is thrown. The clutch sleeve in Fig. 3 is in the act of being withdrawn from the gear H due to the depressed pin. By moving the lever U to the left after the disengagement of the sleeve and the gear H, lever T at the left will be depressed by the arm extension V at that side and move the clutch sleeve toward and into engagement with the gear J and an opposite movement of the lever will produce the opposite result. In this form of the invention the operator produces the required operation by the manipulation of the one lever U and is enabled to shift the clutch in either direction or cause the withdrawal of the clutch to stop operation of the parts whereas in Figs. 1 and 2 the operator is required to place the finger upon the pin R or to operate either of the levers T according to the action it is desired to produce.

Various changes may be made in the structure throughout such as will lie within the invention and the meaning of the claims and it is evident that the clutch may be used to engage but a single part H or J and not necessarily engage both parts or opposite parts H J, it being the intent of the invention to provide a pair of members that can be moved into engagement with one another, one having a spiral groove or equivalent means for connecting two machine elements in driving relation and then by the simple engagement of a part with the grooved member cause the movement of the latter and the disengagement of the two elements.

The shaft C may be the driving portion and either of the gears H J the members through which the driving power from the clutch is to be communicated to the gear L. In this event the clutch could then be furnished with separate right and left hand grooves S' and S³, see Fig. 4, either of which could be engaged by the pin to effect the movement of the clutch in either direction, both grooves terminating in a common groove S². But this lies within the spirit of the invention and the meaning of the claims.

Having described my invention, I claim—

1. The combination of a pair of driving members having clutch members, a companion clutch member for engagement with either of the clutch members of the driving members, said companion clutch member being provided with a spiral guide, means to effect engagement of the companion clutch member with either of the clutch members and means engaging the spiral guide to effect a disengagement of the companion clutch member with either of the clutch members.

2. The combination of a pair of driving members having clutch members, a companion clutch member for engagement with either of the clutch members of the driven members, said companion clutch member being provided with a spiral guide, means to effect engagement of the companion clutch member with either of the clutch members, means engaging the spiral guide to effect a disengagement of the companion clutch member with the clutch members and controlling means for effecting the operation of the engaging and disengaging means of the clutch members.

3. In combination, a driven shaft, a driven clutch member rotatable therewith and shiftable lengthwise thereof, a spiral member thereabout, a pair of driving members normally loose on said shaft and disposed at opposite ends of said shiftable clutch member, and each provided with a clutch part, a member fixed relative to the movement of the shiftable clutch member on said shaft and normally in clearance thereof but depressible to engage the spiral member, operable when depressed through engagement with the spiral to release the engagement of said member with either of the driving members, and means independent of said depressible member to move said driven clutch member into engagement with either of said driving members.

In testimony whereof I affix my signature, in presence of two witnesses.

SIMON E. SCHROEDER.

Witnesses:
L. O. EAGLETON,
L. M. THURLOW.